(12) United States Patent
Hishi et al.

(10) Patent No.: US 12,742,442 B2
(45) Date of Patent: Sep. 22, 2026

(54) METHOD FOR REMOVING SCALE FROM GEOTHERMAL TURBINE BLADE AND METHOD FOR GEOTHERMAL POWER GENERATION

(71) Applicant: JAPAN METALS AND CHEMICALS CO., LTD., Tokyo (JP)

(72) Inventors: Yasuyuki Hishi, Tokyo (JP); Noriaki Kawakami, Tokyo (JP); Anzu Ikei, Tokyo (JP); Shunichi Hirayama, Tokyo (JP)

(73) Assignee: JAPAN METALS AND CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 18/547,485

(22) PCT Filed: Feb. 24, 2022

(86) PCT No.: PCT/JP2022/007569
§ 371 (c)(1),
(2) Date: Aug. 22, 2023

(87) PCT Pub. No.: WO2022/181679
PCT Pub. Date: Sep. 1, 2022

(65) Prior Publication Data

US 2024/0183343 A1 Jun. 6, 2024

(30) Foreign Application Priority Data

Feb. 24, 2021 (JP) ................................ 2021-027987

(51) Int. Cl.
*F03G 4/00* (2006.01)
*F01D 25/00* (2006.01)

(52) U.S. Cl.
CPC ........... *F03G 4/069* (2021.08); *F01D 25/002* (2013.01)

(58) Field of Classification Search
CPC .............................. F03G 4/069; F01D 25/002
See application file for complete search history.

(56) References Cited

U.S. PATENT DOCUMENTS 9,187,354 B2 11/2015 Inoue et al.
2012/0279522 A1 11/2012 Varrin, Jr. et al.
(Continued)

FOREIGN PATENT DOCUMENTS

EP 0 061 298 A1 9/1982
JP 58-85371 A 5/1983
(Continued)

OTHER PUBLICATIONS

Machine Translation of JP 6121294B2 (Year: 2017).*
(Continued)

*Primary Examiner* — Sharidan Carrillo
(74) *Attorney, Agent, or Firm* — Rankin, Hill & Clark LLP

(57) ABSTRACT

A method for removing scale from a turbine blade in a geothermal power generation system has been developed. The developed method for removing scale from a turbine blade is characterized in that an alkaline solution and a chelating solution are injected into geothermal steam flowing into a turbine during power generation and geothermal scale formed adhering to the turbine blade is removed using the injected solutions. The present removal method can remove the scale adhering to a geothermal turbine blade in a short amount of time by improving the scale removal effect than heretofore. Further, a method for geothermal power generation preventing scale adhesion to the turbine blade is provided and a geothermal power generation system can be provided that enables continuous operation without performing opening and cleaning the turbine, even when geo-
(Continued)

thermal steam containing 0.1 ppm or more of $SiO_2$ and/or Cl is introduced into the turbine.

12 Claims, 3 Drawing Sheets

(56) References Cited

U.S. PATENT DOCUMENTS

| | | | | |
|---|---|---|---|---|
| 2014/0083949 | A1 | 3/2014 | Takahashi et al. | |
| 2014/0165564 | A1 | 6/2014 | Inoue et al. | |
| 2015/0121867 | A1 | 5/2015 | Kubota et al. | |
| 2017/0198198 | A1* | 7/2017 | Mahmoud | C09K 8/532 |
| 2019/0323379 | A1* | 10/2019 | Gill | B08B 3/10 |
| 2021/0222517 | A1* | 7/2021 | Muller | E21B 37/06 |
| 2023/0056620 | A1* | 2/2023 | Reyes | E21B 37/06 |
| 2024/0183343 | A1* | 6/2024 | Hishi | F03G 4/00 |

FOREIGN PATENT DOCUMENTS

| | | | | |
|---|---|---|---|---|
| JP | 2-197693 | A | 8/1990 | |
| JP | 2011-196197 | A | 10/2011 | |
| JP | 2013-43145 | A | 3/2013 | |
| JP | 2013-518179 | A | 5/2013 | |
| JP | 2018-080673 | A | 5/2018 | |
| WO | 2012/144277 | A1 | 10/2012 | |
| WO | WO-2012142396 | A1 * | 10/2012 | C02F 1/68 |

OTHER PUBLICATIONS

Machine Translation of JP63-028890A (Year: 1988).*

Machine Translation of CN101768748A (Year: 2010).*

Written Opinion of the International Searching Authority dated May 24, 2022, Application No. PCT/JP2022/007569; English translation included; 6 pages.

Iceland Office Action and Search Report issued by the Danish Patent and Trademark Office on Feb. 28, 2024; 5 pages.

Office Action issued by Danish Patent Office dated Jan. 23, 2025, Icelandic patent application No. IS 050572; 5 pages.

Philippines Office Action, mailed on Mar. 10, 2026, for corresponding Philippines Application No. Jan. 2023/552331; 7 pages.

Office Action issued by the Danish Patent Office dated Sep. 12, 2025, Icelandic patent application No. IS 050572; 4 pages.

* cited by examiner

Alkaline S : alkaline solution

Mixed CS : mixed chemical solution

METHOD FOR REMOVING SCALE FROM GEOTHERMAL TURBINE BLADE AND METHOD FOR GEOTHERMAL POWER GENERATION

TECHNICAL FIELD

The present invention relates to a method for removing scale adhering to a geothermal turbine blade and a method, using the same, for geothermal power generation with improved power generation efficiency.

BACKGROUND ART

Geothermal power generation is a well-known power generation method as natural energy with fewer $CO_2$ emissions. In particular, solar power generation and wind power generation, which are also natural energy, vary in their power outputs depending on various weather conditions, while geothermal power generation can stably generate power and is thus superior in that it can be utilized as a base load power supply.

The geothermal power generation and the thermal power generation differ in that the thermal power generation burns fuels to generate steam, with the force of which, the turbine is rotated to generate power, while the geothermal power generation utilizes steam collected from the underground. Therefore, as compared to the thermal power generation, the $CO_2$ emissions can be significantly reduced. Meanwhile, since the steam collected from the underground contains various chemical components, problems that are not observed in the typical thermal power generation occur.

One of the problems is adhesion of the scale. This is a problem in which a change in the state of the geothermal steam in accordance with the power generation causes various chemical components to precipitate from the steam. In particular, precipitation of the scale on the turbine blade significantly affects the power generation efficiency, which has conventionally been a problem.

Therefore, geothermal power generation plants adopt a method such as periodically halting the turbine to remove the scale adhering to the turbine blade using a sand blast or the like.

Other than the method of directly removing the scale using the sand blast or the like, for example, a method of removing the scale precipitated on the turbine blade by injecting water into the geothermal steam at a turbine inlet portion is disclosed (Patent Literature 1).

Further, Patent Literature 2 discloses a method of removing the scale containing, as main components, silica and sodium chloride precipitated on the turbine blade by injecting an alkaline solution at a turbine inlet portion.

Furthermore, Patent Literatures 3 and 4 disclose a method in which for the purpose of inhibiting precipitation of calcium silicate hydrate (calcium silicate) generated in dissolving amorphous silica in hot water piping by injecting an alkaline agent into the hot water, a chelating agent is injected in advance.

CITATION LIST

Patent Literature

Patent Literature 1: Japanese Patent Laid-Open No. 2-197693

Patent Literature 2: Japanese Patent Laid-Open No. 58-85371

Patent Literature 3: Japanese Patent Laid-Open No. 2013-43145

Patent Literature 4: International Publication No. WO 2012/144277

SUMMARY OF INVENTION

Technical Problem

In recent years, amid rapidly increasing demand for the geothermal power generation, how the power generation cost can be reduced has been a critical issue for its widespread use. In particular, since the impact on the power generation cost of the scale, which is unique to the geothermal power generation, cannot be ignored, a technique of suppressing such an impact of the scale has been desired.

However, in the method conventionally performed of directly removing the scale precipitated on the turbine blade using the sand blast or the like, the turbine blade could be damaged and in addition, power generation cannot be performed due to the necessity of halting the turbine for the scale removal, so that there has also been a significant cost burden.

Further, the methods described in Patent Literature 1 and Patent Literature 2 can remove the scale without halting the turbine, but have not been considered capable of performing sufficient removal of the scale. Moreover, the scale removal takes time, which has accordingly caused more damage to the turbine.

When water is injected into the steam at the front of the turbine as in the methods described in Patent Literature 1 and Patent Literature 2, the injection water turns into saturated hot water and flows into the turbine. The saturated hot water boils under reduced pressure during the course of passing through the turbine and flowing into a condenser. During the boiling under reduced pressure, cavitation occurs on the turbine blade surface, causing erosion in the turbine blade. In normal operation, the steam scarcely contains saturated hot water, thus causing less cavitation, but since water injection significantly increases cavitation, the time for water injection into the turbine has been desired to be reduced as much as possible.

Further, to avoid turbine scale generation, the use itself of geothermal steam containing 0.1 ppm or more of $SiO_2$ and/or Cl for power generation through introduction into the turbine is avoided, and therefore, the geothermal steam properties have been required to be improved using costly separators or the like.

In a power generation facility already in operation, in a case where $SiO_2$ and/or Cl become above 0.1 ppm, there has been a problem in that various laws and regulations need to be met for modification to or addition of equipment such as separators or the like, and nearly two years have been taken for the measures to be completed.

Moreover, the inventions described in Patent Literatures 3 and 4 concurrently use an alkaline agent and a chelating agent as a technique of inhibiting amorphous silica scale precipitated from the hot water in the hot water piping due to oversaturation, without indicating any effect of removing turbine scale using the chelating agent. The turbine scale as a dissolution target of the present patent invention is the scale formed such that water droplets in the geothermal steam boil in accordance with reduced pressure inside the turbine to evaporate to dryness, and adhere onto the turbine blade, which significantly differs in chemical properties and physical properties of components or the like from the amorphous silica scale precipitated from hot water due to oversaturation in Patent Literatures 3 and 4. For these reasons, it is believed that even those skilled in the art could not readily have conceived of concurrent use of the alkaline agent and the chelating agent for the scale removal from the turbine blade, and despite the issue of the scale adhering to the turbine blade remaining unresolved, no information on actual practice of the present invention has been disclosed.

The present invention is for solving such problems, and the objectives are to provide a technique capable of removing, in a short amount of time, scale adhering to a geothermal turbine blade by improving the scale removal effect than heretofore, to provide a method for geothermal power generation preventing the scale from adhering to a turbine blade, and to provide a geothermal power generation system enabling continuous operation without opening and cleaning a turbine, even when geothermal steam containing 0.1 ppm or more of $SiO_2$ and/or Cl is introduced into the turbine.

Solution to Problem

The method for removing scale from a turbine blade to achieve the aforementioned objectives is characterized in that the method includes a step of injecting an alkaline solution and a chelating solution into geothermal steam flowing into a turbine during power generation and a step of removing geothermal scale formed adhering to a turbine blade using the solutions injected. The method removes the scale adhering to the turbine in a shorter amount of time than heretofore by injecting the alkaline solution and the chelating solution without halting the turbine, that is, during power generation.

Further, the method for removing scale from a turbine blade according to the present invention is characterized in that: (a) amounts of the solutions to be injected are determined on the basis of a turbine inlet steam pressure; (b) the solutions to be injected are injected into the steam after being diluted with condensate from a condenser; (c) the solutions to be injected have a pH of 10 or higher; and (d) the chelate is aminocarboxylic acid-based chelate.

Further, the method for geothermal power generation to achieve the aforementioned objectives is characterized in that an alkaline solution and a chelating solution are injected into steam flowing into a turbine.

Furthermore, a geothermal power generation system to achieve the aforementioned objectives including piping for delivering steam to a turbine, the turbine connected to the piping, and a power generator connected to the turbine is characterized in that the geothermal power generation system further includes a tank for storing an alkaline solution and a chelating solution, and the tank is connected to the piping so as to be able to inject the alkaline solution and the chelating solution into the geothermal steam.

Advantageous Effects of Invention

According to the present invention, the scale adhering to the turbine blade can be dissolved at a higher removal rate and in a shorter amount of time than heretofore. Further, steam with inferior properties deviated from values recommended by turbine manufacturers can be used for power generation. The values recommended by turbine manufacturers for steam properties are steam properties that are less likely to generate turbine scale as long as the steam properties fall within the recommended range and that cause no problem for long-term continuous operation. For example, most turbine manufacturers recommend that both $SiO_2$ and Cl in the steam flowing into the turbine be 0.1 ppm or less, and it is empirically known that when steam containing $SiO_2$ and Cl exceeding this is regularly used, adhesion of turbine scale occurs.

It should be noted that the reason why the aforementioned effects are obtained by the present invention is presumed to be based on the following mechanism.

The main components of the scale adhering to the turbine are amorphous silica and sodium chloride, but scale formed of calcium, iron, magnesium, or the like is slightly (e.g., around 5%) contained therein. For example, the method disclosed in Patent Literature 2 injects an alkaline solution into a turbine blade to dissolve a silica component.

However, sodium chloride and amorphous silica are dissolved, while the other scale such as calcium remains on the turbine blade surface in such a configuration like osteoporosis bone (coarse sponge-like form) keeping a steam passage blocked. It is presumed that since calcium and the like contained in the scale are present as elements forming a mineral different from the amorphous silica, the scale was not completely dissolved.

On the other hand, it is presumed that with the chelate mixed, the mineral containing calcium and the like was dissolved, so that the scale remaining in the turbine blade was reduced and in addition, the dissolution of the entire turbine scale has been proceeded.

Accordingly, it is assumed that with the use of a mixed solution of the alkaline solution and the chelating solution as a scale dissolving agent, it has become possible to obtain an effect exceeding that obtained in a case of using the alkaline solution only.

Further, as described in Patent Literatures 3, 4, it is known that amorphous silica scale is dissolved with the alkaline solution and precipitation of calcium silicate is inhibited with the chelating solution, but the method for dissolving the scale generated in the geothermal turbine with the chelating agent is a method first disclosed in the present examples.

DESCRIPTION OF EMBODIMENTS

Embodiment 1

Hereinafter, embodiments for carrying out the present invention will be described, but the embodiments of the present invention are not limited thereto and any modification can be made within the scope without departing from the gist of the present invention.

Figure 5:
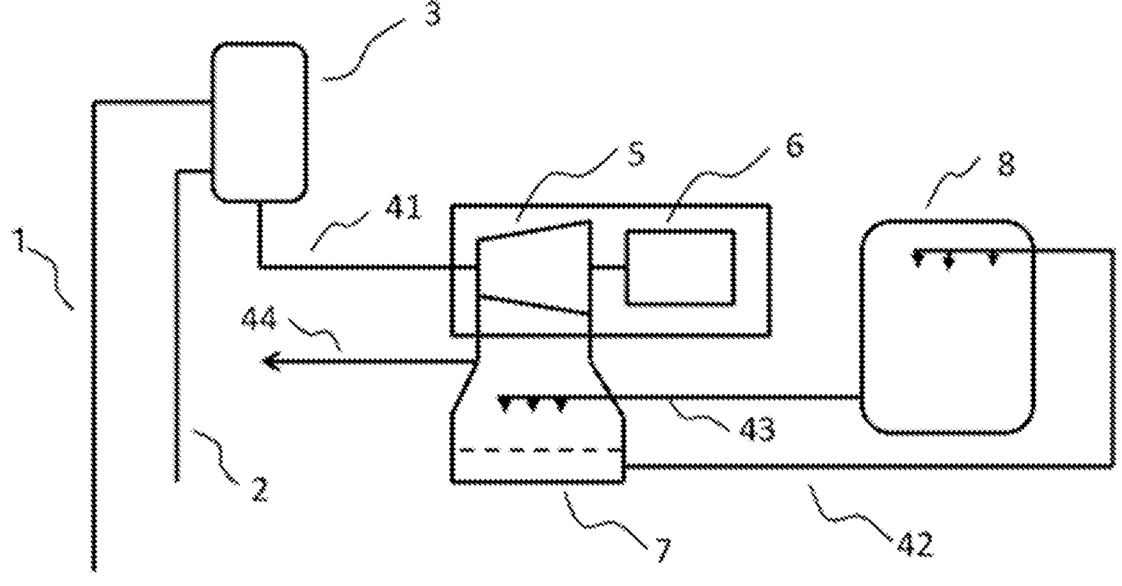
FIG. 5 is a configurational diagram of a conventional geothermal power generation facility.

FIG. 5 shows a conventional configuration according to a geothermal power generation facility. Steam collected from the underground is delivered via a production well 1 to the ground to be supplied to a steam separator 3. The steam separator 3 separates hot water taken out together with the steam from the underground. The separated hot water is returned via a reinjection well 2 to the underground. Meanwhile, the separated steam is supplied via piping 41 to a turbine 5 and with the use of a rotational force of the turbine 5 rotated by the force of the steam, electricity is generated by a power generator 6. The generated electricity is transmitted via an electricity transmission line (not shown).

After passing through the turbine 5, the steam is cooled and condensed in a condenser 7 to become condensate. In this manner, since the pressure inside the condenser turns into a low-pressure state due to the condensation of the steam, a rotation efficiency of the turbine can be improved.

The condensate is supplied via piping 42 to a cooling tower 8 to be cooled, and is recirculated via piping 43 to the condenser 7 to be supplied for cooling the steam in the condenser 7. It should be noted that non-condensable gas contained in the geothermal steam is released from the condenser 7 to the atmosphere via piping 44.

Figure 1:
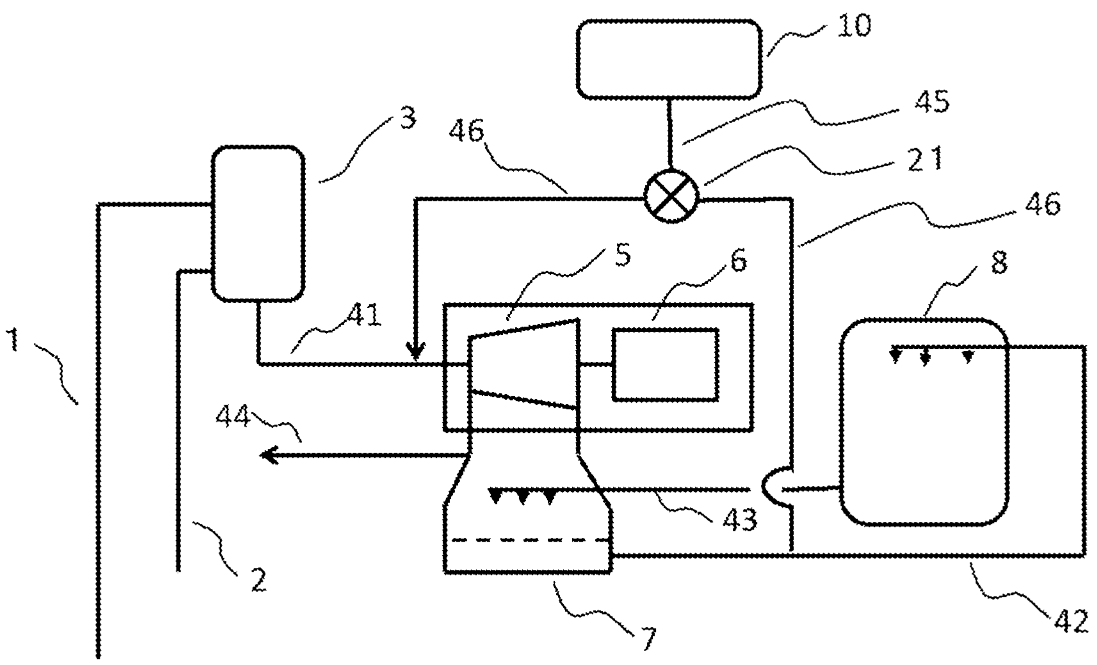
FIG. 1 is a configurational diagram of a geothermal power generation facility according to the present invention.

Next, Embodiment 1 of the present invention will be described with reference to FIG. 1. In FIG. 1, except that a chemical solution tank 10, an injection amount adjuster 21, and piping 45, 46 are newly provided, Embodiment 1 is the same as the conventional example shown in FIG. 5.

The chemical solution tank 10 stores a mixed chemical solution (hereinafter referred to as "mixed chemical solution") of an alkaline solution and a chelating solution for dissolving and removing scale. The alkaline solution may be any solution that dissolves silica scale, the examples of which include a sodium hydroxide solution, a potassium hydroxide solution, and the like. Further, the chelating solution may be any solution that dissolves calcium and metal such as iron, the examples of which include an aminocarboxylic acid-based chelating agent, a phosphonic acid-based chelating agent, and an organic acid chelating agent.

The mixed chemical solution in the chemical solution tank 10 is supplied via the piping 45 to condensate flowing through the piping 46. The supply amount of the mixed chemical solution is adjusted so that injection water to be injected into the turbine (hereinafter referred to as "turbine injection water") has a desired pH value. The pH of the turbine injection water only needs to exhibit alkalinity, and when the pH is 10 or higher, a higher removal effect is exhibited, which is thus preferable, and when the pH is 11.5 or higher, a further higher removal effect is exhibited, which is thus particularly preferable.

The adjustment of the supply amount of the mixed chemical solution is performed by the injection amount adjuster 21 installed in a merging portion between the piping 45 and the piping 46. Further, the adjustment of the injection amount of the condensate is also performed by the injection amount adjuster 21.

Thereafter, the turbine injection water is merged with the steam from the underground flowing through the piping 41 and is supplied to the turbine 5.

It should be noted that as the other side to be supplied with the mixed chemical solution, river water, underground water, or the like can also be used in place of condensate, but in terms of avoiding corrosion of the steam piping, the turbine, or the like due to dissolved oxygen, the injection water preferably contains less dissolved oxygen. The condensate in the condenser 7 is in a vacuum deaeration state having less dissolved oxygen, and is thus preferable as the injection water.

The mixing ratio of the chelating solution in the mixed chemical solution is preferably 0.1 wt % to 1.0 wt %. The ratio of the chelating solution in the mixed chemical solution varies depending on the constituent minerals of the turbine scale, and thus can be optimized for each power generation plant. When the ratio of the chelating solution in the mixed chemical solution is lower than 0.1 wt %, the scale cannot be sufficiently removed. Meanwhile, when the ratio of the chelating solution is higher than 1.0 wt %, the scale removal effect cannot be improved so much for the amount of chelate used. Further, the mixing ratio of the alkaline solution in the mixed chemical solution is preferably 10 wt % to 25 wt %.

The injection amount of the turbine injection water is preferably 0.5 to 3 t/h relative to 100 t/h of the steam amount. This is because of the following reasons. When the injection amount accounts for less than 0.5% of the flow amount of the steam, the scale cannot be sufficiently removed and dissolution takes time. For reducing the dissolution time, a larger injection amount per unit time is favorable, while in a case where the injection amount accounts for over 3%, the erosion risk of the turbine increases.

The injection amount adjuster 21 has a function of adjusting separately the injection amounts of the mixed chemical solution and the injection water.

The embodiment may be made such that in place of the chemical solution tank 10 for storing the mixed chemical solution of the alkaline solution and the chelating solution, individual tanks for the alkaline solution and the chelating solution, as well as a control unit for the injection amount of the solution from each tank, are provided. With the chemical solution tanks separately provided for each chemical solution, there are advantages of enabling not only omission of a step of mixing the two chemical solutions, but also setting any mixing ratio of each chemical solution in accordance with the removal state of the scale. For example, adjustment is available such that upon commencement of scale removing work, initially, water or the alkaline solution is injected, and when the scale dissolution rate is lowered, mixing of the chelate is started or the like.

The mixed chemical solution is configured to be led to the turbine 5 through the piping 45, 46, 41. Further, a site where the mixed chemical solution merges from the piping 46 into the piping 41 may be anywhere between the steam separator 3 and the turbine 5, but is preferably a site near the turbine 5. This is because since drains are set between the merging site and the turbine 5 in some cases, when the merging site is far from the turbine 5, the mixed solution could leak from the drains. In other words, the merging site is preferably positioned between a drain on the upstream side of and closest to the turbine 5 and the turbine 5.

Embodiment 2

In the technical field of geothermal power generation, it is common practice that when scale adheres to the turbine, the scale is removed by opening and cleaning the turbine. For doing so, the turbine, that is, power generation is inevitably halted. Thus, to avoid such a circumstance, turbine manufacturers typically require a certain quality of the properties of the steam to be introduced into the turbine. This is a recommended value that does not cause any problems for long-term continuous operation, and troubles occurring from constant use of steam with properties that deviate from this are out of a compensation coverage by the turbine manufacturer.

For example, most turbine manufacturers recommend 0.1 ppm or less of both $SiO_2$ and Cl in the steam flowing into the turbine, and it is empirically known that when the steam containing $SiO_2$ and Cl exceeding this is used, adhesion of the turbine scale occurs.

On the other hand, when an apparatus described in Embodiment 1 is used to periodically inject the mixed chemical solution, the amount of scale adhesion can be constantly curbed to a certain amount or less, which does not cause trouble in power generation. Therefore, steam which could not be used for power generation in the past due to inferior steam properties, can also be used for power generation. In other words, steam that has conventionally been unavailable for power generation because of its poor steam properties also becomes available for power generation.

It should be noted that the injection of the mixed chemical solution may be performed not only on a regular basis, but also in such an irregular manner as injecting only when the scale adhesion amount reaches a certain amount, or on a continuous basis.

In particular, in the manner of injecting the mixed chemical solution only when the scale adhesion amount reaches a certain amount, damage to the turbine can be minimized, which is a further preferable embodiment.

It should be noted that whether the scale adhesion amount has reached a certain amount can be determined on the basis of whether a turbine control value, which will be described later, or a turbine inlet steam pressure has exceeded a predetermined value.

Further, the present embodiment is applicable not only to a case in which the steam properties are constantly inferior, but also to a case in which the quality of the steam properties cannot be stable in a nonconstant manner or a case in which at least one of $SiO_2$ and Cl exceeds 0.1 ppm.

Example 1

The present invention was carried out using a scale sample collected from an actual geothermal turbine.

The solutions and the pH used are summarized in Table 1. For the mixed chemical solutions of the examples, a 0.1 wt % solution using EDTA was first prepared and then a small amount of a NaOH solution was added to adjust the pH of the solutions to be around 10, 11, and 12, respectively. As the alkaline solutions of comparative examples, a sodium hydroxide solution was used.

TABLE 1

| | Solution | pH |
|---|---|---|
| Example 1 | NaOH + EDTA | 10.07 |
| Example 2 | NaOH + EDTA | 11.02 |
| Example 3 | NaOH + EDTA | 12.07 |
| Comparative Example 1 | NaOH | 9.92 |
| Comparative Example 2 | NaOH | 11.01 |
| Comparative Example 3 | NaOH | 11.97 |

A scale sample in an amount of 0.5 g collected from the actual geothermal turbine and pulverized was put in a Teflon (registered mark) container together with 20 mL of each solution shown in Table 1 and further, the Teflon container was entirely enclosed in a metal pressure container. Subsequently, reaction was conducted using a hydrothermal synthesis reactor unit (manufactured by Hiro Company, model KH-01) under the conditions of a reaction temperature at 130° C. and a 24-hour reaction time. In doing so, the reaction container was rotated six times per minute and the scale sample and the solution were continuously agitated.

After the hydrothermal synthetic reaction, residues were confirmed in all the samples. It should be noted that no distinct change in the form or the color tone of the scale samples was observed before and after the reaction. Based on the confirmed residue amount, the amount reduction rate (%) was calculated following an expression (Expression 1) below. The calculated results are shown in FIG. 2.

[Expression 1]

$$\text{amount reduction rate (\%)} = \frac{\left\{\begin{array}{c}\text{scale sample weight before reaction (g)} - \\ \text{scale sample residue weight (g)}\end{array}\right\}}{\text{scale sample weight before reaction (g)}} \times 100$$

Figure 2:
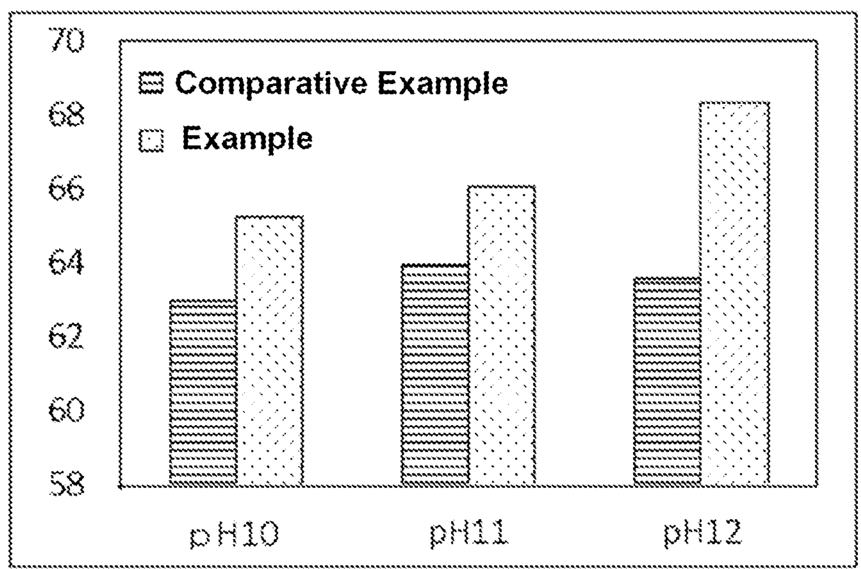
FIG. 2 is a chart showing an amount reduction rate (%) in Example 1.

It is clear from FIG. 2 that when the pH is the same, the mixed solution with the chelate mixed therein constantly exhibited a higher amount reduction rate. In particular, when the pH is 12, the difference was noticeable. This confirms that the effect of the mixed solution is particularly preferable when the pH is 11.5 or higher.

Next, for the samples after being subjected to the hydrothermal synthetic reaction, an analysis of concentration of components in each solution was conducted using an ICP Optical Emission Spectrometry (Shimadzu Corporation, model: ICPE-9000) and the dissolution rate of each component was obtained from the concentration following an expression (Expression 2) below. The obtained dissolution rate of each component is shown in FIG. 3.

[Expression 2]

$$\text{dissolution rate of each component (\%)} = \frac{\text{dissolved weight of each component (g)}}{\text{scale sample weight before reaction (g)}} \times 100$$

Figure 3:
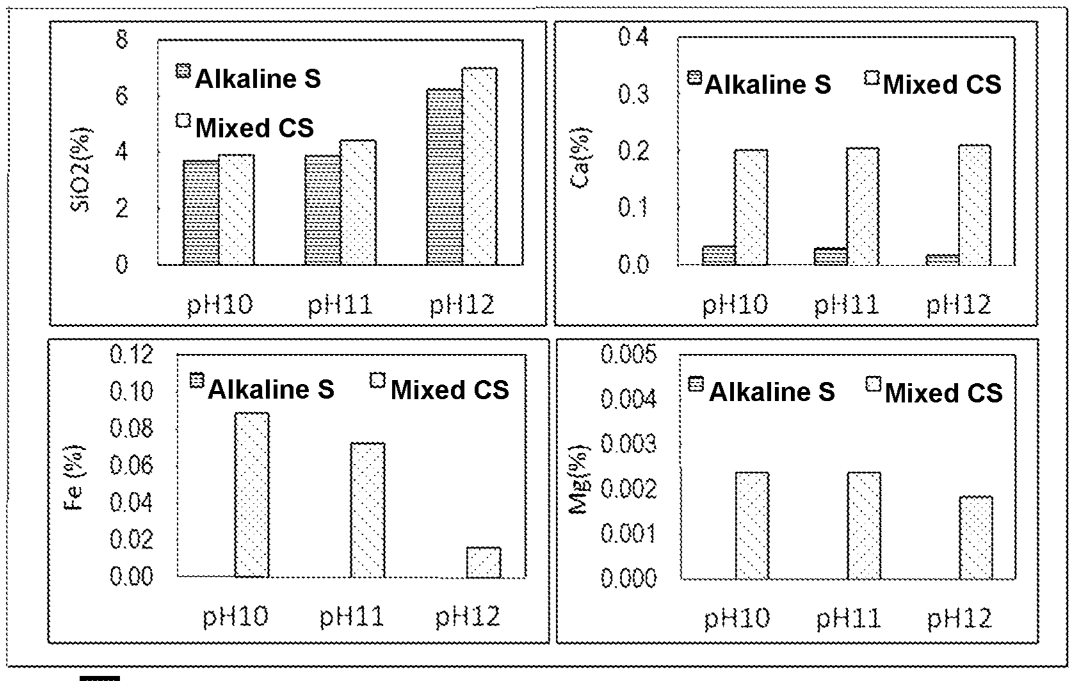
FIG. 3 is a chart showing a dissolution rate (%) of each component in Example 1.

It is clear from FIG. 3 that in the case of the alkaline solution only, Ca, Fe, and Mg are scarcely dissolved. On the other hand, it is clear that when the mixed solution is used, the components are all dissolved to a certain amount. For example, the dissolution rate of Ca improves about ten times.

When a comparison is made between the examples and the comparative examples for $SiO_2$ under the same pH condition, in all cases, the dissolution rate improved when the mixed solution was used as compared to the case in which only the alkaline solution was used. In particular, when the pH is 12, the dissolution rate was maximized and the difference in the dissolution rate widened. In view of these, it is assumed that the Ca, Fe, and Mg contained in the scale were dissolved so that the amorphous silica and the solution contacted more, and the dissolution rate of $SiO_2$ was also increased.

It should be noted that as the other characteristics, the dissolution rate of the $SiO_2$ exhibited a positive correlation with respect to the pH of the solution in both cases with the alkaline solution and with the mixed solution.

Example 2

Next, the present invention was carried out in an actual geothermal plant.

The turbine in the plant where the present invention was carried out generates power of 7 MW.

The present example used a mixed chemical solution in which 25 wt % NaOH as the alkaline solution and 0.1 wt % EDTA as the chelate were mixed. Further, the injection amount of the mixed chemical solution was adjusted so that the pH of the injection water after merged with condensate was from 11.0 to 12.0.

Further, in the present example, for the purpose of confirming the cleaning effect depending on the difference in the components of the injection water, in addition to the above, condensate (pH 4.5) alone and a cleaning solution with the pH adjusted to be 11.0 to 12.0 by mixing only the alkaline solution (NaOH) with condensate were also used as the injection water.

Then, as a first stage, only the condensate was injected at a rate of 1.2 t/h for about one hour from the start of a cleaning test, and subsequently, as a second stage, the injection water using the alkaline solution was injected for 2.5 hours (the injection amount at 1.2 t/h), and then finally, as a third stage, the injection water using the mixed chemical solution was injected for 19 hours (the injection amount at 1.2 t/h).

Further, as an indicator for confirming the cleaning effect, a turbine control value was used. The turbine control value herein is a value determined by an expression (Expression 3) below, and a greater value is exhibited for greater precipitation of the scale in the turbine blade.

$$\text{turbine control value} = \frac{\text{turbine inlet pressure } (barA)}{\text{flow rate of steam introduced into turbine } (\text{kg/h})} \quad \text{[Expression 3]}$$

Figure 4:
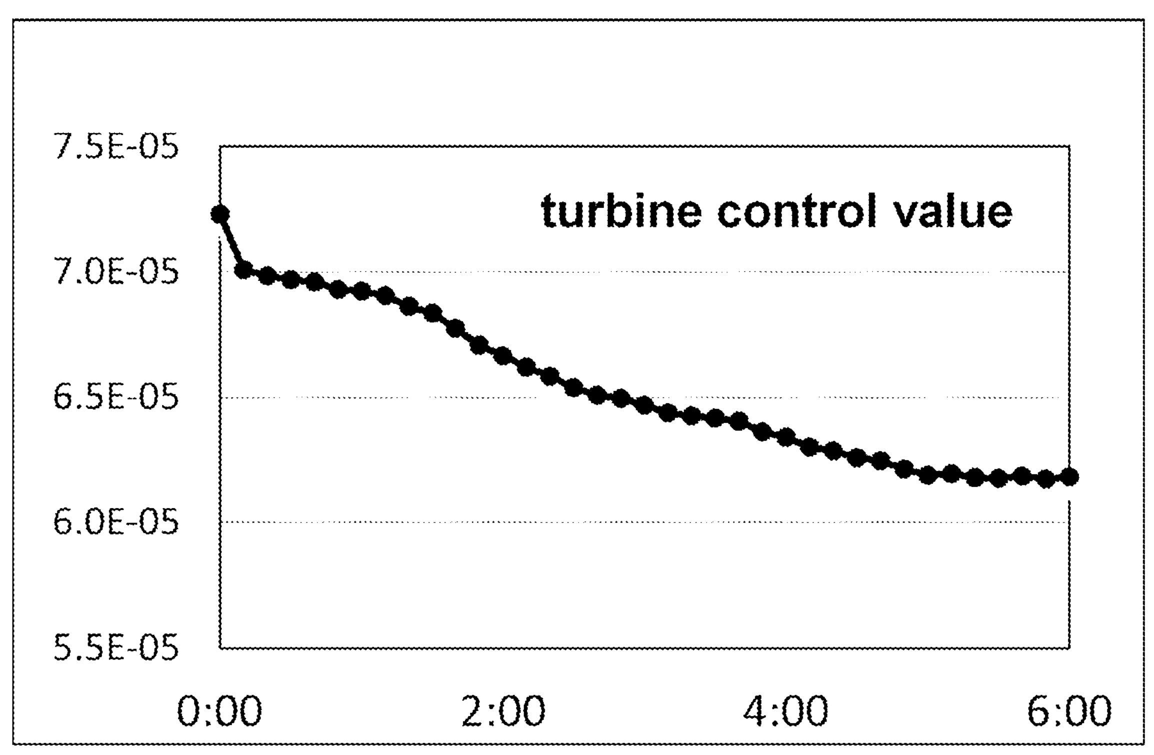
FIG. 4 is a chart showing a turbine control value in Example 2.

The results are shown in FIG. 4. It should be noted that in FIG. 4, the unit in the lateral axis represents time (starting time of injecting injection water set at 0:00) and the longitudinal axis represents the turbine control value. In every stage, in 10 to 20 minutes after switching the cleaning solution, the cleaning effect appeared. Further, in the case of condensate only, the scale removal effect subsided to some extent when one hour passed after the injection, but when the alkaline solution was injected afterwards as the second stage, the removal effect was further exhibited, and after 2.5 hours passed, the removal effect gradually weakened. As the third stage, when the mixed chemical solution was injected, the scale removal effect was remarkably reexhibited. In every stage, whether to stop the cleaning can be determined when the reduction rate of the turbine control value becomes constant. Similarly, in normal operation (when power generation is performed without injecting water), the timing of performing turbine cleaning can be determined on the basis of the increase in the turbine control value.

It should be noted that the decrease in the turbine control value in each stage was 29.4% in the first stage (injection water only), 48.1% in the second stage (alkaline solution only), and 22.5% in the third stage (mixed chemical solution).

It is clear from Example 2 that the scale cleaning effect is the highest with the mixed chemical solution, followed by the alkaline solution and then the condensate. It should be noted that as an indicator for determining the cleaning effect, the value of the turbine inlet steam pressure can also be used in place of the turbine control value.

INDUSTRIAL APPLICABILITY

According to the present invention, since the removal of the scale from the turbine blade can be practically performed while generating power in the geothermal power generation, the power generation can be stably continued without reducing the power output due to the scale. Further, the present invention enables continuous power generation without performing cleaning with the turbine blade opened or the like even when geothermal steam containing 0.1 ppm or more of $SiO_2$ and/or Cl as the steam properties is used.

Further, the present technique is applicable not only to the geothermal power generation, but also to the thermal power generation (including the hot spring power generation) using steam with a silica component, a calcium component, and the like dissolved therein in a similar manner.

REFERENCE SIGNS LIST

1 production well
2 reinjection well
3 steam separator
41-46 piping
5 turbine
6 power generator
7 condenser
8 cooling tower
10 chemical solution tank
21 injection amount adjuster

The invention claimed is:

1. A method for removing geothermal scale from a turbine blade, the method consisting of the steps of:

injecting only a mixed chemical solution of an alkaline solution and a chelating solution into geothermal steam flowing into a turbine while the turbine is rotating during power generation; and removing geothermal scale formed adhering to the turbine blade using the mixed chemical solution injected, the scale being primarily composed of amorphous silica and sodium chloride, wherein the mixed chemical solution is injected between a steam separator and the turbine into the geothermal steam, and wherein the mixed chemical solution has a pH of greater than 10.

2. The method for removing geothermal scale from a turbine blade according to claim 1, wherein the alkaline solution is an aqueous solution containing sodium hydroxide and/or potassium hydroxide.

3. The method for removing geothermal scale from a turbine blade according to claim 1, wherein amounts of the mixed chemical solution to be injected is determined based on a turbine inlet steam pressure.

4. The method for removing geothermal scale from a turbine blade according to claim 1, wherein a chelate in the chelating solution is aminocarboxylic acid-based chelate.

5. The method for removing geothermal scale from a turbine blade according to claim 2, wherein amounts of the mixed chemical solution to be injected is determined based on a turbine inlet steam pressure.

6. The method for removing geothermal scale from a turbine blade according to claim 2, wherein a chelate in the chelating solution is aminocarboxylic acid-based chelate.

7. A method for removing geothermal scale from a turbine blade, the method consisting of the steps of:

diluting a mixed chemical solution of an alkaline solution and a chelating solution with condensate from a condenser, river water, or underground water;

injecting only the mixed chemical solution that has been diluted into geothermal steam flowing into a turbine while the turbine is rotating during power generation; and removing geothermal scale formed adhering to the turbine blade using the mixed chemical solution that has been diluted that is injected, the scale being primarily composed of amorphous silica and sodium chloride, wherein the mixed chemical solution that has been diluted is injected between a steam separator and the turbine into the geothermal steam, and wherein the mixed chemical solution has a pH of greater than 10.

8. The method for removing geothermal scale from a turbine blade according to claim 7, wherein a chelate in the chelating solution is aminocarboxylic acid-based chelate.

9. The method for removing geothermal scale from a turbine blade according to claim 7, wherein the alkaline solution is an aqueous solution containing sodium hydroxide and/or potassium hydroxide.

10. A method for geothermal power generation while removing geothermal scale from a turbine blade during power generation, comprising collecting steam and hot water from underground via a production well;

separating the steam and the hot water by a steam separator;

supplying the separated steam to the turbine;

rotating the turbine by the separated steam;

generating electricity in a power generator by a rotational force of the turbine; and performing the method for removing geothermal scale from the turbine blade according to claim 7.

11. The method for removing geothermal scale from a turbine blade according to claim 9, wherein a chelate in the chelating solution is aminocarboxylic acid-based chelate.

12. A method for geothermal power generation while removing geothermal scale from a turbine blade during power generation, comprising collecting steam and hot water from underground via a production well;

separating the steam and the hot water by a steam separator;

supplying the separated steam to the turbine;

rotating the turbine by the separated steam;

generating electricity in a power generator by a rotational force of the turbine; and performing the method for removing geothermal scale from the turbine blade according to claim 1.

* * * * *